INVENTOR
Nils Paul Göransson

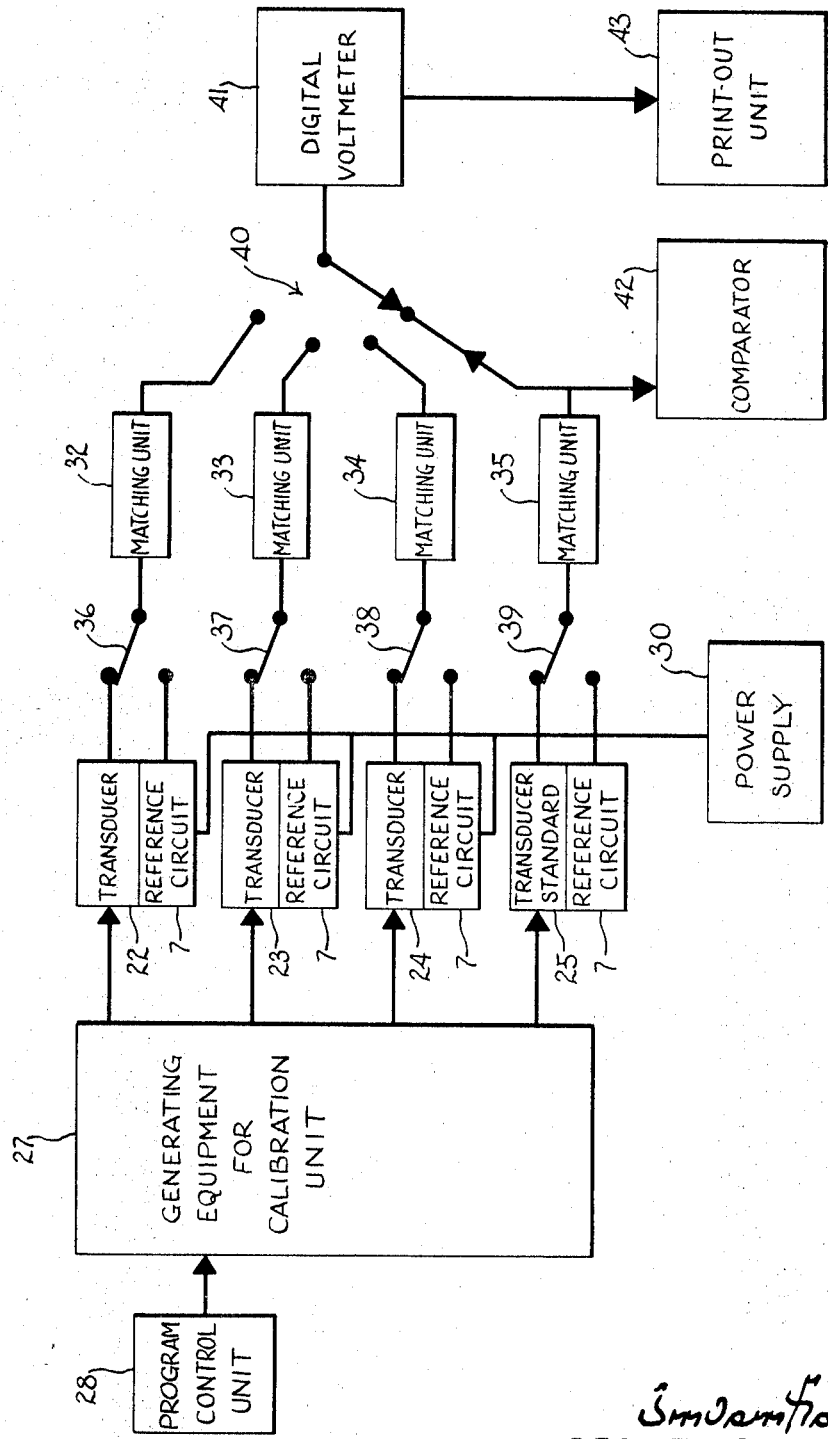

United States Patent Office 3,535,637
Patented Oct. 20, 1970

3,535,637
CALIBRATION OF ELECTRICAL MEASURING TRANSDUCER DEVICES
Nils Paul Goransson, Hjulsbro, Sweden, assignor to Saab Aktiebolag, Linkoping, Sweden, a corporation of Sweden
Filed Oct. 23, 1968, Ser. No. 769,882
Claims priority, application Sweden, Oct. 26, 1967, 14,639/67
Int. Cl. G01r 35/00
U.S. Cl. 324—130                                                5 Claims

ABSTRACT OF THE DISCLOSURE

To a transducer measuring device comprising transducer element(s) in a bridge circuit there is nondetachably connected reference circuit means for producing a zero reference signal and a 50% level reference signal. The zero signal circuit comprises a resistance having impedance equalling that of the bridge circuit with transducer element(s) unexcited. The 50% reference signal circuit has a common feed voltage input with the bridge but is otherwise independent of the bridge, and its impedance equals the output impedance of the bridge with the transducer element(s) excited to 50% of the measurement range. Apparatus is disclosed for simultaneously and automatically calibrating several such devices.

---

This invention pertains to electrical transducer devices for measuring such physical magnitudes as temperature, pressure motion and elongation, and the invention relates more particularly to transducer devices of the type having transducer means connected in a bridge circuit to produce measurement signals that can be fed into an indicating instrument and reference signal producing means adapted to feed reference value signals into the indicating instrument so that the readings of the indicating instrument in response to the measurement signals can be compared with its readings in response to the reference signals to provide for evaluation of the measurement signals.

Ordinarily the response characteristics of a sensitive device employed as a transducer are established and known. Thus, for example, an element used as a heat responsive transducer in a thermometric device will have resistance characteristics that vary in a known manner with changes in the temperature to which the element is subjected, so that a curve of temperature v. resistance for the element itself can be accurately plotted.

However, when such an element is incorporated in a bridge circuit connected with an indicating instrument or read-out device. unknown factors, both constant and variable, are introduced by the other components of the bridge circuit and by the indicating instrument, and in some cases also by environmental conditions. Because of such unknown factors, readings corresponding to measurement signals from the bridge circuit have no significance in and of themselves. Instead, it is necessary to establish standardized values to which the readings corresponding to measurement signals can be referred. Thus, if the readings that will appear on the indicating instrument at two or more specific points in the range of the transducer element can be known or readily ascertained, then the curve of magnitude to be measured v. readings at the instrument is established, so that the reading corresponding to any particular measurement signal can be compared to the standardizing value readings at those specific points, and from such comparison it is possible to ascertain the true measurement value signified by the measurement signal reading.

One heretofore known manner of obtaining standardizing values has been to connect a standardizing resistance in parallel with an element of the bridge circuit in order to effect a predetermined unbalance of the bridge, thus producing a reference signal corresponding to such bridge unbalance. By connecting the standardizing resistance into the bridge circuit and taking a reading on the reference signal produced by it, then disconnecting it and taking a reading on the measurement signal, the necessary data could be obtained for calculating the measurement value signified by the measurement signal reading.

This prior expedient was not entirely satisfactory because the reference signal was superimposed upon the measurement signal, and therefore the reference signal did not consistently and accurately simulate the output of the bridge circuit at the selected standardization point in the measurement range of the transducer element. In addition, errors could arise because the standardizing resistance was often located at some distance from the transducer, with the result that it was subjected to different environmental conditions (e.g., a different temperature) than the transducer means, and there was a possibility of unsuspected changes in the resistance of the external leads connecting the standardizing resistance with the bridge circuit.

By contrast, it is a general object of the present invention to provide apparatus comprising a transducer device and associated reference signal means whereby these disadvantages of the prior apparatus are eliminated and whereby certain other advantages are achieved that were not heretofore available.

In particular, it is an object of this invention to provide electrical transducer apparatus of the character described that comprises reference signal circuit means arranged to minimize possibilities for error and to facilitate calibration of the apparatus.

With these observations and objects in mind, the manner in which the invention achieves its purpose will be appreciated from the following description and the accompanying drawings. This disclosure is intended merely to exemplify the invention, which can be embodied in forms other than as herein disclosed and which is defined by the appended claims.

The drawings illustrate one complete example of the physical embodiment of the invention constructed according to the best mode so far devised for the practical application of the principles thereof, and in which:

FIG. 3 is a block diagram of apparatus for calibrating transducer measuring devices of this invention.

Figure 1:
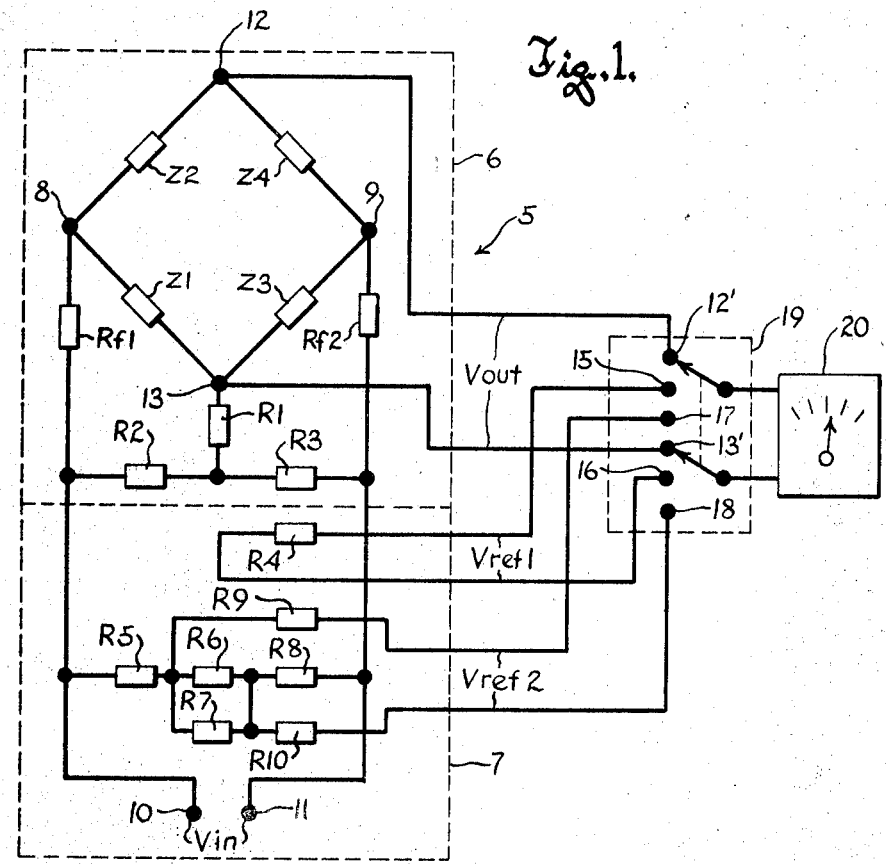
FIG. 1 is a circuit diagram of an electrical transducer measuring device embodying the principles of the present invention.
Figure 2:
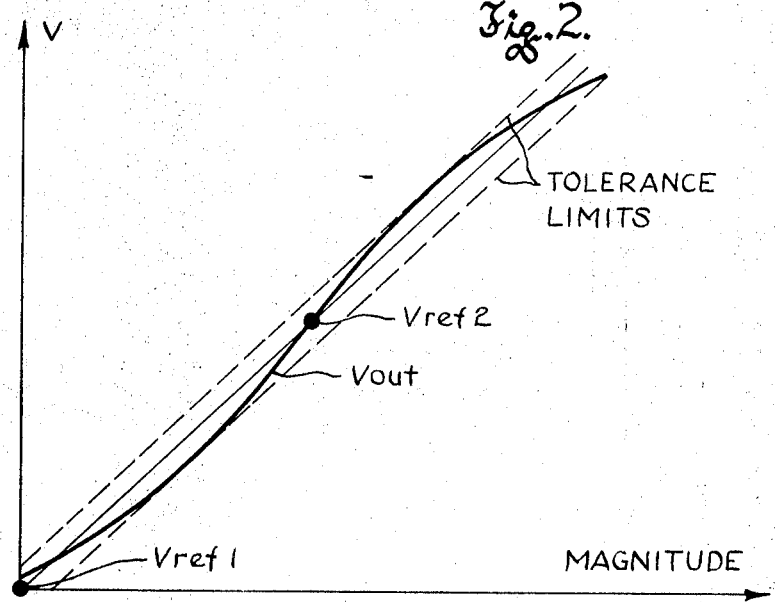
FIG. 2 is a graph of the output signal of a bridge circuit comprising transducer means, plotted as a function of the magnitudes to be measured by the transducer means, with tolerance limits and reference levels indicated.

Referring now to the accompanying drawings, the numeral 5 designates generally an electrical transducer measuring device for measuring a physical magnitude such as pressure, temperature, elongation or motion, and comprising generally electrical means defining a bridge circuit 6 having transducer means connected therein and reference circuit means 7.

The transducer means comprises, in this case, a pair of transducer elements Z1 and Z2, each in a different leg of the bridge circuit 6. The transducer elements can be either resistive, capacitive or inductive, and the other elements of the bridge circuit will be of corresponding character. In this case the transducer elements are shown as resistive, and the remainder of the bridge circuit comprises resistances Z3 and Z4, one in each of the other legs of the bridge circuit.

The resistances Z3 and Z4 are so chosen, with respect to the transducer elements, as to satisfy the bridge condition $$\frac{Z1}{Z3} = \frac{Z2}{Z4}$$

to thus obtain the best output signal.

A feed voltage V*in* is impressed across the input terminals 8 and 9 of the bridge circuit 6 from external input terminals 10 and 11 that are connectable with a suitable voltage source. The feed voltage is brought to the bridge circuit through two series resistances R*f*–1 and R*f*–2, the resistance R*f*–1 being connected between the terminals 10 and 8 and the resistance R*f*–2 being connected between the terminals 11 and 9.

To provide for trimming the bridge so that the output voltage V*out* at its output terminals 12 and 13 will be zero when the transducer elements Z1 and Z2 are unactuated, three resistances R1, R2 and R3 are connected in a star circuit with one output terminal 13 of the bridge and the two feed voltage input terminals 10 and 11.

The reference circuit means 7 is nondetachably connected with the bridge circuit means 6. Hence the lengths of the leads connecting the reference circuit means and the bridge circuit means is permanently fixed so that the resistance values of those leads will not be subject to unpredictable variation. Such nondetachable connection has the further very important advantage of insuring that the reference circuit means will always be subjected to substantially the same environmental conditions (temperature, humidity, etc.) as the bridge circuit means, with the result that the possibility of measurement errors from environmental causes is minimized. The nondetachable connection has additional advantages in that it makes for a compact apparatus, insures against wear and tear on the connecting leads, and leaves no possibility for incorrect connections such as might be made with detachable units.

The reference circuit means 7 comprises passive electric components connected to define two circuits, one of which provides a lower level reference voltage V*ref*1 and the other a higher level reference voltage V*ref*2. The lower level reference voltage V*ref*1 will normally correspond to the zero level of the measuring signal output V*out* of the bridge circuit, while the higher level reference voltage will correspond to the output signal V*out* of the bridge circuit at a predetermined point in the measuring range of the device, which point is preferably the midpoint (50% point) of its range.

The lower level reference voltage V*ref*1 appears across a pair of external terminals 15 and 16 of the device, while the higher level reference signal V*ref*2 appears across another pair of external terminals 17 and 18. The several terminals 15, 16, 17 and 18, together with external terminals 12' and 13' that are respectively connected with the output terminals 12 and 13 of the bridge circuit, comprise the fixed contacts of a selector switch 19 described hereinafter.

The circuit for the lower level reference voltage V*ref*1 comprises a resistance R4 connected across the V*ref*1 output terminals 15 and 16. Since the lower level reference signal in the case of the apparatus here illustrated has zero voltage, the circuit comprising resistance R4 is not connected with the feed voltage terminals 10 and 11. However, the value of the resistance R4 is so chosen that its impedance is equal to the output impedance of the bridge circuit 6 with the transducer elements Z1 and Z2 unactivated.

The terminals 10 and 11 provide a feed voltage input for the higher reference level circuit that is common to the input to the bridge circuit 6. The higher reference level circuit comprises a pair of resistances R6 and R7 that are connected in parallel, and which parallel connected resistances are connected with the feed voltage input terminals 10 and 11 through resistances R5 and R8, respectively, and are connected with the V*ref*2 output terminals 17 and 18 through resistances R9 and R10 respectively. The values of these several resistances are selected according to the formula $$V_{ref}2 = V_{in}\frac{R_p}{R_{tot}}$$

where R*p* is the parallel resistance of R6 and R7, i.e., $$R_p = \frac{R6 \times R7}{R6 + R7}$$

and R*tot*=R5+R*p*+R8.

In the voltage divider comprising the resistances R5, R6, R7 and R8, symmetry with respect to the input voltage is obtained by means of the resistances R5 and R8. The resistances R9 and R10 are of such values as to make the output impedance of the upper reference level circuit symmetrical to ground and equal to the output impedance of the bridge circuit at the reference level.

Fine trimming of the reference level voltage V*ref*2 is done by means of one of the resistances R6 and R7 so that V*ref*2 will correspond to the output signal voltage V*out* of the bridge circuit at a predetermined point (e.g., 50%) in the measurement range of the transducer means.

It will be evident that if the lower level reference voltage is not to be zero, the reference circuit means for the lower reference voltage will correspond generally with the higher reference level circuit just described, except that the resistor values will of course differ appropriately. It will also be apparent that additional reference level circuits could be provided if desired.

In the event that the bridge circuit comprises transducer elements for measuring some physical magnitude other than temperature, but which are temperature sensitive, the reference circuits can comprise components having the same temperature dependance as the transducer elements, in order to provide a built in temperature compensation in the apparatus.

The switch 19 is a triple-throw double-pole switch having its movable contactors connected with the terminals of an indicating instrument or readout device 20 and arranged to be selectively connectable with the several pairs of terminals 15–16, 17–18 and 12'–13', so that the indicating instrument can be connected with each in turn of the reference circuits and the bridge circuit 6. By making such connections in succession, readings can be quickly obtained for V*ref*1, V*ref*2 and the measurement signal V*out*, so that the measurement signal can at any desired time be evaluated by means of the reference signals.

Where a number of similar transducer measuring devices embodying the principles of this invention are in use, each provided with reference circuit means that simulate the same two points in its measurement range, all such transducers, irrespective of their individual output signals, can be standardized to the same reference constants, and they will then be interchangeably useable with any given indicating instrument.

It will be apparent that the measurement signal indications of a transducer device embodying the principles of this invention need not be calibrated in terms of absolute values but can be used in the form of relative values as $$\frac{V_{out}}{V_{ref}2 - V_{ref}1}$$

By means of the apparatus shown in FIG. 3, calibration of a transducer device embodying the principles of this invention can be accomplished automatically and simultaneously with the calibration of other similar transducer devices, and an evaluation of each of the devices (as to whether or not it is within prescribed tolerance limits) can be obtained directly from the results of such calibration.

In FIG. 3, several transducer measuring devices 22, 23, 24 of this invention, each having reference circuit means 7, are connected with a generating device 27. Also connected with the generating device 27 is a transducer standard 25, which likewise has reference circuit means 7. The generating device 27 simulates or reproduces the magnitude to be measured, in values thereof throughout the measurement range of the transducer measuring devices, and it is controlled by a program control unit 28 and is connected with the several transducer measuring devices 22, 23, 24 and 25 in such a manner as to excite their transducers. The transducer standard 25 determines exactly the magnitude of the excitation at any particular time.

All of the transducer devices 22, 23, 24 and 25 are fed with a stabilized input voltage from a power supply 30.

For each of the transducer devices 22, 23, 24 and 25 there is a matching unit 32, 33, 34 and 35, respectively, and each matching unit has a double-throw selector switch 36, 37, 38 and 39, respectively, by which it is alternatively connectable with the bridge circuit means of its transducer device or with the reference circuit means for its transducer device. Each of the matching units is in turn connected with a different one of the multiple terminals of another selector switch 40 through which the several matching units are successively connectable with a digital voltmeter 41. The matching unit 35 that is associated with the transducer standard 25 also has its output fed to a program executing unit 42 that comprises a comparator. As the generating device 27 changes its excitation of the transducer elements, under control of the program control unit 28, the program executing unit 42 produces an impulse each time the output signal of the transducer standard 25 passes through one of a number of predetermined levels (10%, 20%, 30%, etc.) in the total output control range of the transducer standard. Each time such an impulse is issued, signals are fed from the digital voltmeter 41 to a print-out unit 43 that makes written records of the readings appearing on the voltmeter 41, which records provide immediate information concerning the tolerances of the respective transducers.

In using the apparatus shown in FIG. 3, the selector switches 36, 37, 38, 39 of the several matching units are connected with the reference circuit means 7 of their respective transducer devices, for feeding their higher reference level outputs Vref2 into the digital voltmeter 41. By means of the multiple selector switch 40 the Vref2 signal from each of the transducer devices in turn is fed to the digital voltmeter while the matching unit for the transducer device is adjusted to produce a predetermined reading (e.g., 500 units) on the digital voltmeter.

Then the selector switches 36, 37, 38, 39 are positioned to feed into the matching units the Vout measurement signals from the bridge circuits of their respective transducer devices. As the transducer exciting output of the generating device 27 changes in a manner determined by the program control unit 28, the comparator of the program executing unit 42 compares the signals from the transducer standard with predetermined signal values corresponding to the selected points (e.g., 10%, 20%, 30%, etc.) in the range of the transducer standard. Each time such a point is reached, the program executing unit 42 actuates the multiple selector switch 40 to feed the measurement signal from each in turn of the transducer devices (including the transducer standard) to the printout device 43. The latter records the value of the signal of the transducer standard and of the corresponding signals, at that level of excitation, from the transducer devices being calibrated, so that the recorded values for the transducer devices being calibrated can be directly compared with those for the transducer standard for each level of excitation, and from such comparison it can be determined immediately whether or not each of the transducer devices being calibrated is within tolerance limits.

The recording of the signals from the several transducer devices at each sweep of the multiple selector switch takes place so rapidly that the change in level of excitation that occurs during the recording interval can be neglected.

When the signals for the last (100%) level of excitation are recorded, the program control unit 28 terminates the calibration procedure.

From the foregoing description taken with the accompanying drawings it will be apparent that this invention provides means for producing reference signals by which an electrical transducer device is standardized, whereby errors due to human and environmental factors are substantially eliminated and whereby calibration of a plurality of transducer devices is greatly facilitated.

What is claimed as my invention is:

1. An electrical transducer device for measuring a physical magnitude, of the type comprising transducer means, and means defining a bridge circuit in which the transducer means is connected and which has input terminals connectable with an electrical feed source and output terminals connectable with an indicating instrument, said device being characterized by:
    means defining a reference circuit, corresponding to a predetermined level of excitation of the transducer means and adapted to produce a reference voltage simulating that across the output terminals of the bridge circuit means at its corresponding level of transducer means excitation, said reference circuit means
        (1) being nondetachably connected with the bridge circuit means,
        (2) having input terminals in common with those of the bridge circuit means so as to be connectable with the same electrical feed source,
        (3) having output terminals that are independent of the output terminals of the bridge circuit means,
        (4) comprising passive electrical components, and
        (5) having its output impedance equal to that of the bridge circuit at its corresponding level of excitation of the transducer means.

2. The electrical transducer device of claim 1, in combination with at least one other such device having the same measurement range and having reference circuit means simulating the same level of transducer means excitation, further characterized by:
    (A) means for exciting the transducer means of all said devices simultaneously, through the range of magnitudes that includes said levels;
    (B) a plurality of matching units, one for each transducer device, each of said matching units being connectable with output terminals of its transducer device and being adjustable so that the output of the reference circuit of its transducer device, as modified by the matching unit, can be made equal to the corresponding modified outputs of the other transducer devices;
    (C) means for selectively and alternatively connecting each matching unit either with the bridge circuit output terminals of its transducer device or with the output terminals for said reference circuit thereof; and
    (D) an indicating instrument selectively connectable with each of said matching units to enable comparison of the modified outputs of their transducer devices.

3. The combination of claim 2, further characterized by:
    one of said transducer devices being a calibrated standard.

4. In an electrical device for measuring a physical magnitude, of the type comprising transducer means sensitive to said magnitude and means connected with the transducer means in a bridge circuit having input terminals connectable with an electrical feed source and output terminals connectable with an instrument for indicating the prevailing value of an electrical characteristic of the bridge circuit that varies in dependence upon the value of the physical magnitude to be measured, calibration means comprising:
  (A) passive simulator means having input terminals and output terminals and having said electrical characteristic in a value equal to that which said characteristic of the bridge circuit has when the physical magnitude exciting the transducer means has a predetermined value;
  (B) means nondetachably connecting the input terminals of the simulator means with the input terminals of the bridge circuit so that the simulator means is always energized from the same electrical current source that energizes the bridge circuit; and
  (C) switch means for alternatively connecting with the indicating instrument either the output terminals of the bridge circuit, for measurement, or the output terminals of the simulator, for calibration.

5. The device of claim 4, further characterized by:
  said simulator means having an impedance substantially equal to the output impedance of the bridge circuit.

References Cited

UNITED STATES PATENTS 3,439,258   4/1969   Van Leeuwen ____ 324—74 XR

A. E. SMITH, Primary Examiner

U.S. Cl. X.R.

324—74; 73—1